(12) United States Patent
Kampitsch et al.

(10) Patent No.: US 10,078,000 B2
(45) Date of Patent: Sep. 18, 2018

(54) METHOD AND DEVICE FOR DETERMINING THE FILLING MASS OF A CRYOGENICALLY STORED GAS IN A CONTAINER

(71) Applicant: Bayerische Motoren Werke Aktiengesellschaft, Munich (DE)

(72) Inventors: Markus Kampitsch, Neukeferloh (DE); Stefan Schott, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 466 days.

(21) Appl. No.: 14/834,706

(22) Filed: Aug. 25, 2015

(65) Prior Publication Data
US 2015/0362353 A1    Dec. 17, 2015

Related U.S. Application Data

(63) Continuation of application No. PCT/EP2014/050920, filed on Jan. 17, 2014.

(30) Foreign Application Priority Data

Feb. 26, 2013 (DE) .......... 10 2013 203 187

(51) Int. Cl.
*G01F 22/02* (2006.01)
*F17C 13/02* (2006.01)
(Continued)

(52) U.S. Cl.
CPC ............ *G01F 23/22* (2013.01); *F17C 13/001* (2013.01); *F17C 13/023* (2013.01);
(Continued)

(58) Field of Classification Search
CPC .. G01F 15/0755; G01F 23/0061; G01F 22/02; G01F 17/00; G01F 23/14;
(Continued)

(56) References Cited

U.S. PATENT DOCUMENTS

| 4,984,457 A | 1/1991 | Morris |
| 5,616,838 A * | 4/1997 | Preston ................. F17C 13/021 62/50.1 |

(Continued)

FOREIGN PATENT DOCUMENTS

| DE | 296 15 453 U1 | 11/1996 |
| DE | 100 41 051 B4 | 8/2006 |

(Continued)

OTHER PUBLICATIONS

International Search Report dated May 30, 2014 (Two (2) pages).
German Search Report dated Jul. 15, 2015, with Statement of Relevancy (Nine (9) pages).

*Primary Examiner* — Harshad R Patel
*Assistant Examiner* — Brandi Hopkins
(74) *Attorney, Agent, or Firm* — Crowell & Moring LLP

(57) ABSTRACT

A method for determining a filling mass in a thermally insulated container for a cryogenically stored gas includes determining the filling mass using a known container volume and a calculated density of the gas content of the container. A temperature sensor is used for measuring a mixing temperature of liquid and gaseous phases, where the liquid phase is extracted via a first extraction supply line at the geodetically lowest point, and the gaseous phase is extracted via a second extraction supply line at the geodetically highest point. Downstream of the extraction points, after a convergence of the first and the second extraction supply line, the temperature sensor is placed where a complete and thorough mixing of the liquid and the gaseous phase of the gas from the first and second extraction supply line has already taken place.

10 Claims, 1 Drawing Sheet

(51) Int. Cl.
  *G01F 23/22* (2006.01)
  *F17C 13/00* (2006.01)
  *G01F 23/00* (2006.01)

(52) U.S. Cl.
  CPC ............ *F17C 13/026* (2013.01); *G01F 22/02* (2013.01); *G01F 23/0061* (2013.01); *F17C 2201/0109* (2013.01); *F17C 2201/035* (2013.01); *F17C 2201/056* (2013.01); *F17C 2201/058* (2013.01); *F17C 2203/0391* (2013.01); *F17C 2203/0629* (2013.01); *F17C 2221/012* (2013.01); *F17C 2221/033* (2013.01); *F17C 2223/0161* (2013.01); *F17C 2223/041* (2013.01); *F17C 2223/045* (2013.01); *F17C 2223/047* (2013.01); *F17C 2250/043* (2013.01); *F17C 2250/0421* (2013.01); *F17C 2250/0439* (2013.01); *F17C 2250/0491* (2013.01); *F17C 2260/022* (2013.01); *F17C 2260/024* (2013.01); *F17C 2270/0178* (2013.01); *F17C 2270/0184* (2013.01); *Y02E 60/321* (2013.01)

(58) Field of Classification Search
  CPC .......... G01F 23/38; G01F 23/34; G01F 23/30; G01F 23/296; G01F 25/0084; G01F 25/00; G01F 23/26; B64G 1/402; Y10S 73/05; F17C 2201/0157; F17C 2250/0413; F17C 2201/0109; F17C 2201/056; F17C 2203/0629; G01N 9/24
  See application file for complete search history.

(56) References Cited

U.S. PATENT DOCUMENTS

| | | | | |
|---|---|---|---|---|
| 5,744,945 | A * | 4/1998 | Hodge | .................. G01F 23/24 324/441 |
| 5,745,377 | A * | 4/1998 | Power | .................. G01F 23/266 702/150 |
| 8,370,088 | B2 | 2/2013 | Ammouri et al. | |
| 2005/0247123 | A1 | 11/2005 | Fuse | |
| 2009/0223289 | A1* | 9/2009 | Krammer | .............. G01F 23/246 73/290 R |

FOREIGN PATENT DOCUMENTS

| | | |
|---|---|---|
| DE | 10 2006 025 654 A1 | 12/2007 |
| DE | 10 2008 005 760 A1 | 7/2009 |
| FR | 2 922 992 A1 | 5/2009 |

\* cited by examiner

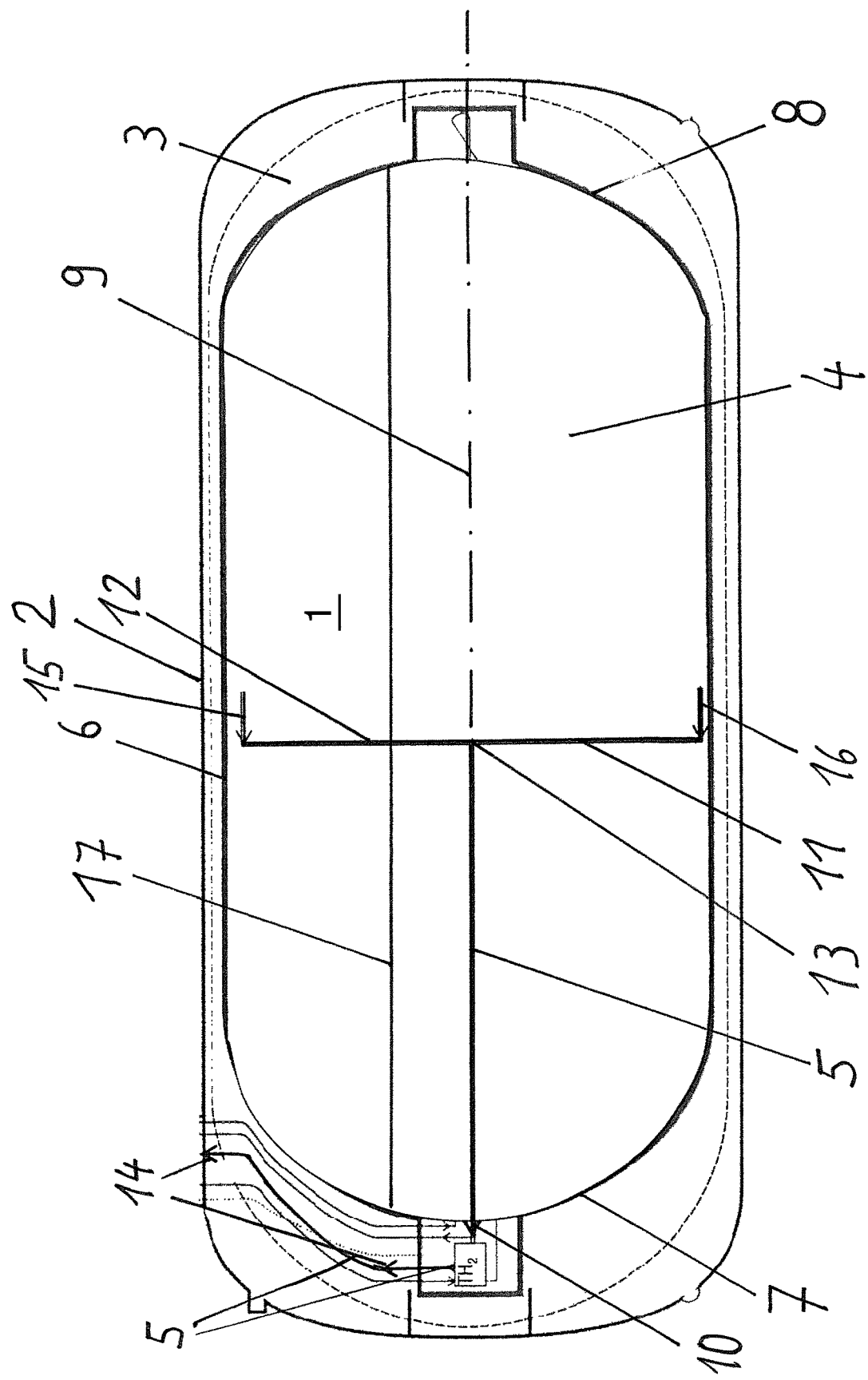

METHOD AND DEVICE FOR DETERMINING THE FILLING MASS OF A CRYOGENICALLY STORED GAS IN A CONTAINER

CROSS REFERENCE TO RELATED APPLICATIONS

This application is a continuation of PCT International Application No. PCT/EP2014/050920, filed Jan. 17, 2014, which claims priority under 35 U.S.C. § 119 from German Patent Application No. 10 2013 203 187.4, filed Feb. 26, 2013, the entire disclosures of which are herein expressly incorporated by reference.

BACKGROUND AND SUMMARY OF THE INVENTION

The invention relates to a method for determining the filling mass of a cryogenically stored gas in a container, which contains a medium that is in one part in the liquid phase and in the other part in the gaseous phase, and also to a device for carrying out the method and to a use thereof in a motor vehicle.

Various measuring methods are used for determining the filling mass of a cryogenically stored gas in a container for indicating, checking and controlling purposes, but they are to some extent greatly restricted with regard to their area of use and their accuracy. Along with other measuring methods, one for example is based on the determination of the pressure difference between the bottom region and the top region of a container. However, the accuracy of this method is often insufficient, since for example the measured values are strongly temperature-dependent. In containers in which ambient pressure prevails, there is the possibility of determining the filling level by a temperature sensor inside the container, since the liquid fraction of a medium that is partly in the liquid phase and partly in the gaseous phase and is under ambient pressure is always colder than the gaseous phase. In the case of containers containing boiling liquid, the phase state at the measuring point is detected on the basis of whether this temperature sensor at the measuring point indicates a temperature greater than or less than the boiling temperature of the medium. This method can be used in a container that is filled with boiling liquid and is under a pressure greater than ambient pressure, since the boiling temperature changes with the pressure and fluctuations in the filling level are also accompanied by fluctuations in pressure. Furthermore, in a container filled as described, a state of equilibrium between the liquid phase and the gaseous phase is established over time. In the case of containers in which the content is under a pressure higher than ambient pressure, on the other hand, capacitive measuring methods may be used. If, however, the container is under high pressure and at low temperatures, this method encounters difficulties, since the sensors available are not suitable for low temperatures and cannot be used in this area. In addition, in the case of capacitive measurements, great errors occur if the cold sensor enters the gas space and condensation takes place on the surface of the sensor.

As a result of heat entering an insulated cryogenic tank system, a thermally induced stratification of the stored medium, for example hydrogen for driving a motor vehicle, occurs, with warm gas collecting in the upper region and cold gas collecting in the lower region of the container. For determining the filling level of such a tank or container, it is also possible to determine the temperature of the medium that is representative for the calculation of the density. This is only possible by measuring the temperature of the medium at multiple representative measuring points inside the tank or outside the tank.

Thus, German Utility Model 296 15 453 describes, for a filling level indication, arranging a sensor chain comprising resistance thermometers and a reference sensor in a container. The reference sensor is in the liquid and it is ascertained by means of the sensor chain which sensor is no longer in the liquid, in turn allowing the level of the liquid of the filling to be deduced.

For this purpose, multiple temperature sensors are required, which increases the cost, complexity and susceptibility to errors. The position of the measuring points must be laboriously determined and ensured throughout the service life. It is also very laborious to exchange defective sensors in the container.

The invention is based on the object of providing a method and a device for determining the filling mass of a cryogenically stored gas in a container which, while involving a simple construction, deliver sufficiently accurate results and avoid the aforementioned disadvantages. Advantageous forms and developments are the content of the dependent claims.

The invention provides a method for determining a filling mass in a thermally-insulated container for a cryogenically stored gas, wherein the filling mass is determined by way of a known container volume and a calculated density of the gas content of the container, the value of which is calculated from a container pressure measurement and a temperature measurement. The method is characterized in that a temperature sensor is used for measuring a mixing temperature of a liquid phase and a gaseous phase of the gas, wherein the liquid phase is extracted by way of a first extraction line at the geodetically lowest point and the gaseous phase is extracted by way of a second extraction line at the geodetically highest point of the container cavity. Moreover, the temperature sensor is placed downstream of the extraction points, after a convergence of the first and second extraction lines to a single extraction line leading out of the container, on the inside or outside of said line, at a location where complete and thorough mixing of the liquid phase and the gaseous phase of the gas from the first and second extraction lines has already taken place.

This method is advantageously carried out with a device for determining the filling mass in a thermally insulated container which contains a medium that is in one part in the liquid phase and in another part in the gaseous phase, which is characterized in that the container is equipped with a pressure gage and with a temperature sensor, which measures a mixing temperature of the liquid phase and the gaseous phase of the gas, for which purpose the liquid phase is extracted by way of a first extraction line at the geodetically lowest point and the gaseous phase is extracted by way of a second extraction line at the geodetically highest point of the container cavity. Moreover, the temperature sensor is placed downstream of the extraction points, after a convergence of the first and second extraction lines to a single extraction line leading out of the container, on the inside or outside of said line, at a location where complete and thorough mixing of the liquid phase and the gaseous phase of the gas from the first and second extraction lines has already taken place.

This has the advantage that the temperature sensor, which is positioned downstream of the extraction points in the extraction line convergence, measures the mixing temperature, and consequently the averaged temperature of the medium that is representative for the filling level determination. Assuming a linear temperature stratification over the height of the container, extracting the medium with the maximum temperature and the minimum temperature makes a very accurate determination of the temperature of the medium possible, since it is ensured that both the coldest gas and the warmest gas occurring in the tank are extracted in equal parts. Only one sensor is required, and it can additionally be arranged in such a way that it can be easily changed in the event of damage. Using a simple series of measurements, it can be calibrated in such a way that possible influences resulting from its positioning along the extraction line can be eliminated.

Therefore, a preferred method is characterized in that stored calibration or correction values or calibration or correction functions are used for making allowance at least for the position of the temperature sensor in the determination of the filling mass.

A further preferred method provides that the filling mass of the container is determined as and when desired or is automatically determined repeatedly at time intervals.

This is advantageous for regularly renewing the indication if a container is used as a store for receiving the cryogenic gas as an operating medium of a drive unit of a motor vehicle and is held in a thermally insulated manner in an outer container that is accommodated in the motor vehicle and if the motor vehicle has in its interior an indicating device that presents to a driver of the motor vehicle the last-calculated filling mass, at least in comparison with a maximum filling mass and a minimum filling mass.

Advantageous devices for carrying out the method are distinguished by the fact that the connecting point of the two extraction lines or the single extraction line is configured in such a way that complete and thorough mixing of the liquid phase and the gaseous phase of the gas from the first and second extraction lines takes place. If the temperature sensor is located outside the container, even easier maintenance is possible.

It is advantageous for the calculation of the filling mass if the device has a control device with a computing device, which determines the filling mass of the container as and when desired or automatically repeatedly at time intervals. In this case, calibration or correction values or calibration or correction functions stored in the computing device may be used for making allowance at least for the position of the temperature sensor in the determination of the filling mass.

The following description with the associated drawing describes a preferred exemplary embodiment of the invention.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE schematically shows a section through a container for cryogenically stored gas with a device according to one embodiment of the invention for the use of a method for determining the filling mass of the cryogenically stored gas in the container that can be used as a motor vehicle tank.

DETAILED DESCRIPTION OF THE DRAWING

As shown in the FIGURE, a cryotank that can be used in a motor vehicle (not depicted) as a tank for a cryogenically stored gas 4 consists of two containers lying one inside the other, an inner container 1 and an outer container 2. The outer container 2 is preferably produced from a high-grade steel alloy or an aluminum alloy. The inner container 1 may consist on the inside of a metallic liner that is wound with fiber composite material. The space 3 between the containers 1, 2 is evacuated and the inner container 1 is mounted in the outer container 2. A cryogenically stored gas, such as for example hydrogen, also referred to as medium 4, is stored under pressure in the inner container 1 and is thermally insulated from the surroundings by the vacuum in the space 3.

The medium 4 is extracted in a single extraction line 5, which is led out from the container, runs in the inner container 1, consisting of the horizontal cylinder 6 and terminating covers 7, 8 integrally formed in a spherical manner respectively on each side thereof, in a straight line along a cylinder center axis 9 and also leaves this inner container through its vertex in the spherical terminating cover 7 (indicated and depicted by an arrow 10). At the end of the single extraction line 5 inside the container, this line branches into a vertically running first extraction supply line 11 to the geodetically lowest point of the container cavity and a vertically running second extraction supply line 12 to the geodetically highest point of the container cavity, wherein a liquid phase is extracted through the first extraction supply line 11 and a gaseous phase of the medium 4 is extracted through the second extraction supply line 12. The extraction of the gaseous phase in the upper region of the inner container 1 is graphically represented by an arrow 15 and the extraction of the liquid phase in the lower region of the inner container 1 is graphically represented by an arrow 16. The two phases are shown as separated by a line 17 indicating a liquid level. A connecting point 13 of the first and second extraction supply lines 11, 12 to the single extraction line 5 is configured in such a way that complete and thorough mixing of the liquid phase and the gaseous phase of the medium or else cryogenically stored gas 4 from the first and second extraction supply lines 11, 12 takes place there. As an alternative to this, the single extraction line 5 in the inner container 1 may also simply just be made long enough.

For determining the mass of the cryogenically stored gas 4 in the inner container 1, in the latter there is a pressure gage (not depicted). A temperature sensor TH2 is accommodated in the intermediate space 3, between the inner container 1 and the outer container 2, on the single extraction line 5. This is graphically represented by the single extraction line 5, interrupted by the temperature sensor TH2, with arrows 14, which represents a direction of extraction of the medium 4 in a symbolically indicated manner. In this case, the temperature sensor TH2 may be fitted on the inside or outside of the extraction line 5.

The temperature sensor TH2 measures a mixing temperature of the liquid phase and the gaseous phase of the medium 4, for which purpose the liquid phase is extracted by way of the first extraction supply line 11 at the geodetically lowest point (indicated and depicted by arrow 16) and the gaseous phase is extracted by way of the second extraction supply line 12 at the geodetically highest point (indicated and depicted by arrow 15) of the cavity of the inner container 1. For this purpose, the temperature sensor TH2 is placed downstream of the extraction points 15, 16, after the convergence by way of the connecting point 13 of the first and second extraction supply lines 11, 12 to a single extraction line 5 leading out of the container 1, on the inside or outside of said line, at a location where complete and thorough mixing of the liquid phase and the gaseous phase of the medium 4 from the first and second extraction supply lines 11, 12 has already taken place.

In order to determine from this mixing temperature of the cryogenically stored gas 4 its filling mass in the thermally insulated inner container 1, the gas content of the inner container 1 is determined by the procedure with the aid of the known inner container volume and a calculated density. The density is calculated from the container pressure, which is measured by the pressure sensor, and the mixing temperature of the gas 4. Necessary for this purpose is a control device with a computing device, in which the procedure is executed and which can determine the filling mass of the inner container 1 as and when desired or automatically repeatedly at time intervals. In order that the result of the computing routine corresponds at all times to the true container content, each cryotank has to be calibrated after its manufacture. This serves the purpose of storing in the computing device calibration or correction values or calibration or correction functions with the aid of which allowance can be made for example for the position of the temperature sensor (TH2) in the determination of the filling mass.

The inner container 1 may for example be used as a store for receiving the cryogenic gas 4 as an operating medium of a drive unit of a motor vehicle and be held in a thermally insulated manner in the outer container 2 that in turn is accommodated in the motor vehicle, which has in its interior an indicating device that presents to a driver of the motor vehicle the filling mass last calculated by the computing device on account of a command from the control device, at least in comparison with a maximum filling mass and a minimum filling mass.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a filling mass in a thermally insulated container for a cryogenically stored gas, comprising the acts of:
   determining the filling mass using a known container volume and a calculated density of the cryogenically stored gas in the container, wherein the calculated density is calculated from a container pressure measurement and a temperature measurement; and
   measuring, by a temperature sensor, a mixing temperature of a liquid phase and a gaseous phase of the cryogenically stored gas, wherein the liquid phase is extracted by way of a first extraction supply line at a geodetically lowest point and the gaseous phase is extracted by way of a second extraction supply line at a geodetically highest point of a cavity of the container,
   wherein the temperature sensor is placed downstream of the geodetically lowest and highest points, after a convergence of the first and second extraction supply lines to a single extraction line leading out of the container, on an inside or outside of said single extraction line, at a location where complete and thorough mixing of the liquid phase and the gaseous phase of the cryogenically stored gas from the first and second extraction supply lines has already taken place.

2. The method as claimed in claim 1, wherein at least one of stored calibration values, stored correction values, stored calibration functions and stored correction functions are used for making allowance at least for the position of the temperature sensor in the determination of the filling mass.

3. The method as claimed in claim 1, wherein the filling mass of the container is determined as and when desired or automatically repeatedly at time intervals.

4. A device for determining the filling mass in a thermally insulated container which contains a medium that is, in one part, in the liquid phase and, in another part, in the gaseous phase, wherein the container comprises a pressure gage and a temperature sensor that measures a mixing temperature of the liquid phase and the gaseous phase of the cryogenically stored gas,
   wherein the device is configured to extract the liquid phase by way of a first extraction supply line at a geodetically lowest point and to extract the gaseous phase by way of a second extraction supply line at a geodetically highest point of a cavity of the container,
   wherein the temperature sensor is placed downstream of the geodetically lowest and highest points, after a convergence of the first and second extraction supply lines to a single extraction line leading out of the container, on an inside or outside of said single extraction line, at a location where complete and thorough mixing of the liquid phase and the gaseous phase of the cryogenically stored gas from the first and second extraction supply lines has already taken place.

5. The device as claimed in claim 4, wherein at least one of a point of the convergence of the two extraction supply lines and the single extraction line is configured such that complete and thorough mixing of the liquid phase and the gaseous phase of the cryogenically stored gas from the first and second extraction supply lines takes place.

6. The device as claimed in either of claim 5, wherein the temperature sensor is located outside the container.

7. The device as claimed in either of claim 4, wherein the temperature sensor is located outside the container.

8. The device as claimed in either of claim 4, further comprising a control device with a computing device configured to determine the filling mass of the container as and when desired or automatically repeatedly at time intervals.

9. The device as claimed in claim 8, wherein at least one of stored calibration values, stored correction values, stored calibration functions and stored correction functions are used for making allowance at least for the position of the temperature sensor in the determination of the filling mass.

10. A container with a device as claimed in claim 4, wherein said container is used as a store for receiving the cryogenic gas as an operating medium of a drive unit of a motor vehicle and is held in a thermally insulated manner in an outer container that is accommodated in the motor vehicle, wherein the motor vehicle has, in an interior, an indicating device that presents to a driver of the motor vehicle a last-calculated filling mass, at least in comparison with a maximum filling mass and a minimum filling mass.

* * * * *